United States Patent
Yoda et al.

(10) Patent No.: US 12,186,960 B2
(45) Date of Patent: Jan. 7, 2025

(54) INJECTION MOLDING MACHINE

(71) Applicant: NISSEI PLASTIC INDUSTRIAL CO., LTD., Nagano-ken (JP)

(72) Inventors: Hozumi Yoda, Hanishina-gun (JP); Nobukazu Kasuga, Hanishina-gun (JP); Hirofumi Murata, Hanishina-gun (JP)

(73) Assignee: NISSEI PLASTIC INDUSTRIAL CO., LTD., Nagano-Ken (JP)

(*) Notice: Subject to any disclaimer, the term of this patent is extended or adjusted under 35 U.S.C. 154(b) by 0 days.

(21) Appl. No.: 18/434,366

(22) Filed: Feb. 6, 2024

(65) Prior Publication Data

US 2024/0239030 A1 Jul. 18, 2024

Related U.S. Application Data

(62) Division of application No. 17/438,206, filed as application No. PCT/JP2019/048156 on Dec. 9, 2019, now Pat. No. 11,958,225.

(30) Foreign Application Priority Data

Mar. 14, 2019 (JP) .................. 2019-047029

(51) Int. Cl.
  *B29C 45/77* (2006.01)
  *B29C 45/04* (2006.01)
  (Continued)

(52) U.S. Cl.
  CPC .............. *B29C 45/77* (2013.01); *B29C 45/04* (2013.01); *B29C 45/67* (2013.01);
  (Continued)

(58) Field of Classification Search
  CPC .................................................. B29C 45/77
  See application file for complete search history.

(56) References Cited

U.S. PATENT DOCUMENTS

| 4,066,189 A | 1/1978 | Toyoaki et al. |
| 7,547,404 B2 | 6/2009 | McBain et al. |

(Continued)

FOREIGN PATENT DOCUMENTS

| JP | 8-238655 A | 9/1996 |
| JP | 2018-176189 A | 11/2018 |

(Continued)

OTHER PUBLICATIONS

International Search Report for PCT/JP2019/048156 (PCT/ISA/210) mailed on Feb. 10, 2020.

*Primary Examiner* — Benjamin A Schiffman
(74) *Attorney, Agent, or Firm* — Birch, Stewart, Kolasch & Birch, LLP

(57) ABSTRACT

An injection molding machine including a mold clamping device for clamping a mold comprising a fixed mold and a movable mold by a predetermined mold clamping force; an injection device for injecting and filling a resin into the mold by a predetermined injection pressure, wherein the mold clamping device enables natural compression of the resin at least as the resin inside the mold solidifies; and a molding machine controller at least including a specific molding condition setting function for setting a specific molding condition by obtaining a parting opening amount which becomes a predetermined gap between the movable mold and the fixed mold during injection filling, a molding injection pressure which becomes an injection pressure capable of molding a good product and a molding clamping force which becomes a mold clamping force capable of molding a good product; a fast injection condition setting function for setting, as a fast injection condition, a fast injection speed from the start of injection, the fast injection speed being higher than the injection speed set by the specific molding condition, and a fast injection section for continuing the fast injection speed; and a molding control (Continued)

function for mold-clamping the mold clamping device by the molding clamping force, setting the molding injection pressure to a limit pressure, injecting and filling the mold by the fast injection condition from the start of injection, and filling the mold by the specific molding condition by the end of the fast injection section.

7 Claims, 10 Drawing Sheets

(51) Int. Cl.
    *B29C 45/67*     (2006.01)
    *B29C 45/76*     (2006.01)

(52) U.S. Cl.
    CPC ........ *B29C 45/7653* (2013.01); *B29C 45/766* (2013.01); *B29C 45/768* (2013.01); *B29C 2945/76083* (2013.01); *B29C 2945/76096* (2013.01); *B29C 2945/76254* (2013.01); *B29C 2945/76498* (2013.01); *B29C 2945/76505* (2013.01); *B29C 2945/76595* (2013.01); *B29C 2945/76709* (2013.01); *B29C 2945/76732* (2013.01)

(56) References Cited

U.S. PATENT DOCUMENTS

| | | |
|---|---|---|
| 8,696,342 B2 | 4/2014 | Kasuga et al. |
| 9,296,144 B2 | 3/2016 | Murata et al. |
| 9,682,506 B2 | 6/2017 | Murata |
| 9,968,998 B2 | 5/2018 | Tomioka et al. |
| 10,105,754 B2 | 10/2018 | Yokoyama et al. |
| 11,584,050 B2 | 2/2023 | Yoda et al. |
| 2011/0130496 A1 | 6/2011 | Shakir et al. |
| 2012/0146260 A1 | 6/2012 | Murata et al. |
| 2018/0290207 A1 | 10/2018 | Yokoyama |

FOREIGN PATENT DOCUMENTS

| | | |
|---|---|---|
| WO | WO 2008/153336 A2 | 12/2008 |
| WO | WO 2011/161899 A1 | 12/2011 |

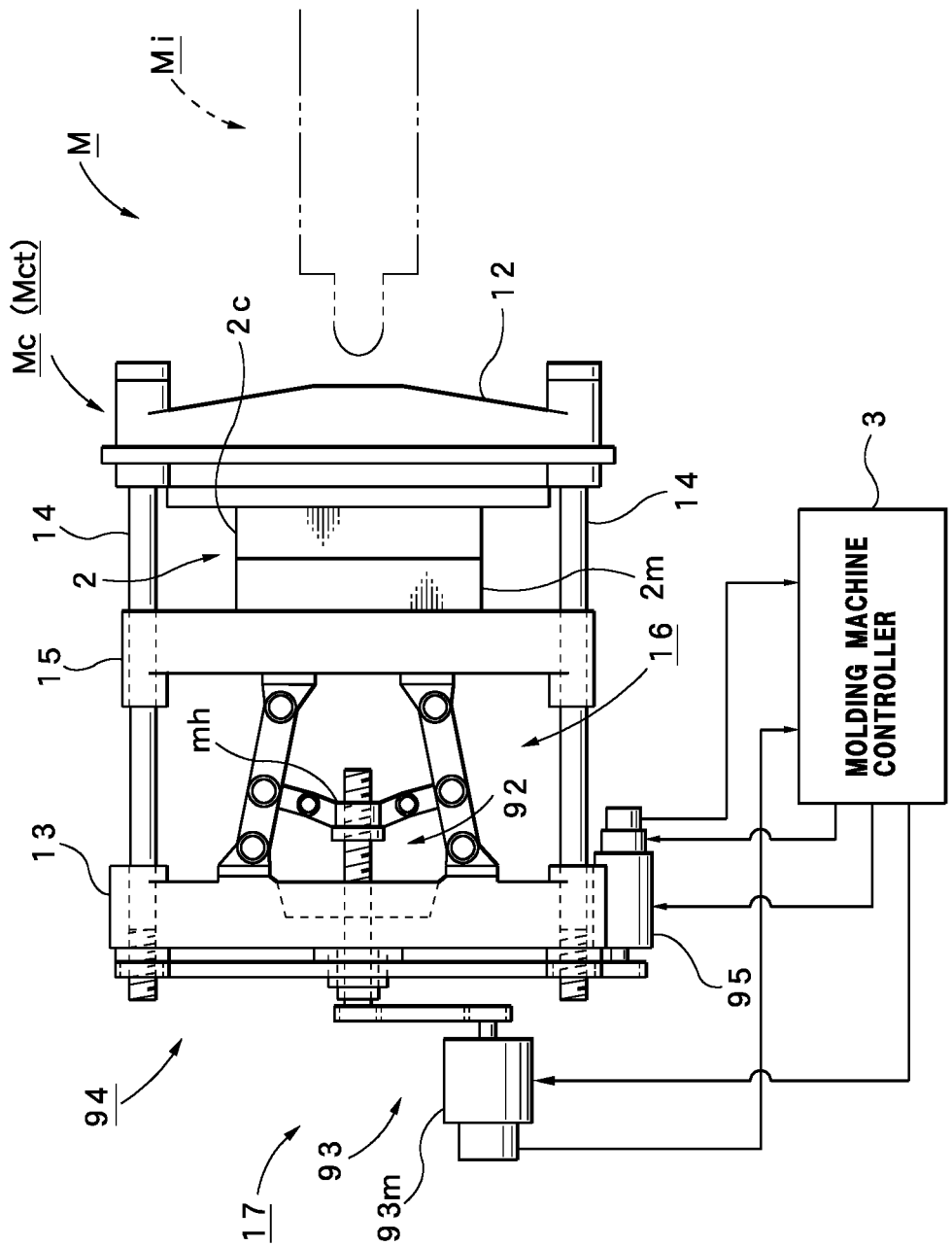

INJECTION MOLDING MACHINE

CROSS-REFERENCE TO RELATED APPLICATIONS

This application is a Divisional of U.S. application Ser. No. 17/438,206, filed on Sep. 10, 2021, which is the National Phase under 35 U.S.C. § 371 of International Application No. PCT/JP2019/048156, filed on Dec. 9, 2019, which claims the benefit under 35 U.S.C. § 119(a) to Patent Application No. 2019-047029, filed in Japan on Mar. 14, 2019, all of which are hereby expressly incorporated by reference in their entirety into the present application.

TECHNICAL FIELD

The present invention relates to an injection molding method and an injection molding machine suitable for use in molding by a specific molding method.

BACKGROUND ART

In the well-known conventional injection molding method, molding is performed by an injection device injecting and filling resin at a predetermined injection pressure into a mold consisting of a fixed mold and a movable mold, mold-clamped by a predetermined mold clamping force, by a mold clamping device. In such a general injection molding method, basically, the clamping conditions of the mold clamping force are set as fixed conditions, and the injection conditions of the injection device are set based on the fixed conditions. Therefore, even if the injection conditions are set accurately and appropriately, the resin filled into the mold is affected by temperature fluctuations in the mold and the clamping mechanism, and the quality and homogeneity of the final molded product are also affected. Further, since the molding conditions are mainly set on the injection device side, it is necessary to set various molding conditions, including injection conditions requiring accuracy such as injection speed, speed switching position, speed pressure switching position, injection pressure, holding pressure, etc., as well as measurement conditions such as measurement values requiring accurate measurement. Therefore, it is not easy to set the molding conditions, and the operation control during molding is complicated. Moreover, since a series of control such as multistage control of injection speed and control of packing pressure is usually performed, the molding cycle time tends to be longer, and there is a limit to shortening the molding cycle time and further to enhancing mass productivity.

Therefore, the present applicant has already proposed a molding method of a suitable injection molding machine that solves these problems with Patent Document 1. The molding method disclosed in document 1 aims to ensure the high quality and uniformity of a molded product, to facilitate the setting of molding conditions, and to improve mass production by shortening the molding cycle time. Specifically, the molding method uses a mold clamping device that enables natural compression of resin as the resin solidifies in the mold to obtain and set in advance the molding injection pressure and the molding clamping force at which a predetermined mold gap is produced between the movable mold and the fixed mold during injecting and filling. In addition, after mold-clamping the mold clamping device by the molding clamping force, setting the molding injection pressure the limit pressure, and driving the injection device to inject and fill the mold with resin during production, the molded product is taken out after a predetermined cooling time has elapsed.

PRIOR ART PUBLICATIONS

Patent Publications

Patent Document 1: WO2011/161899 A1

DISCLOSURE OF THE INVENTION

Problem to be Solved by the Invention

However, the molding method of the injection molding machine in the above-described Patent Document 1 has the following problems to be solved.

First, because the molding injection pressure is set to inject the resin, the mold filling speed is limited by the molding injection pressure. Therefore, there is no problem with a molded product having a relatively short flow length of resin in a mold, such as a small or medium-sized molded product. However, there is a problem that molding becomes difficult in the case of an extensive molded product, that is, an enormous molded product having a width of about 1 m or more, such as a door or bumper, which is an automobile component. For example, in the case of the extensive molded product 100 having a width of about 1 [m] as FIG. 11 shows, the resin injected and filled in the mold starts to solidify before it flows to the end of the cavity. As FIG. 11 shows, a short failure occurs at the end portion 100*s*. For this reason, the large-sized molded product 100, as shown in the example, is practically difficult to be molded or difficult to be satisfactorily molded.

Second, the large-sized molded product 100 may be molded by a conventional injection molding method, i.e., an injection molding method in which the molding conditions on the injection apparatus side allow for injecting and filling with high speed and high pressure. In this case, even if short defects are avoided, on the other hand, there is a risk that a large number of burrs may occur in a wide range, which may damage the mold. For this reason, there has been a demand for a new or improved injection molding method capable of realizing high-quality and excellent molding for a wide range of sizes of molded products, from small molded pieces to extensive molded products.

It is an object of the present invention to provide an injection molding method and an injection molding machine that solve such problems existing in the background art.

Means for Solving the Problem

To solve the problem mentioned above, the injection molding method according to the present invention is characterized in that, when molding is performed by injecting and filling a resin R at a predetermined injection pressure by an injection device Mi into a mold 2 comprising a fixed mold 2*c* and a movable mold 2*m*, which are mold-clamped by a mold clamping device Mc with a predetermined mold clamping force, at least a mold clamping device Mc is used that enables natural compression of the resin R as the resin R solidifies inside mold 2. In advance during injection filling, obtain the molding injection pressure Pi, which generates a parting opening amount Lm that is a predetermined gap between the movable mold 2*m* and the fixed mold 2*c* of mold 2 and is capable of molding good products, and the molding clamping force Pc, which is the clamping force capable of molding a good product, and set them as the specific molding condition Dc. In addition, set a fast injection speed Vf from the start of injection, which is higher than the injection speed set by the specific molding condition Dc, and a fast injection section Zf that continues the fast injection speed Vf as fast injection conditions Df. During molding, mold-clamp the mold with the molding clamping force Pc and set the molding injection pressure Pi as the limit pressure Ps. Inject and fill mold 2 with the resin R under the fast injection condition Df from the start of injection. After ending the fast injection section Zf and injection filling of the resin R under the specific molding condition Dc, when a predetermined cooling time has elapsed, a molded article G is taken out from mold 2.

To solve the problem mentioned above, the injection molding machine M according to the present invention, is characterized by being provided with a mold clamping device Mc for clamping a mold 2 comprising a fixed mold 2c and a movable mold 2m with a predetermined mold clamping force, and an injection device Mi for injecting and filling a resin R into mold 2 with the predetermined injection pressure. The injection molding machine M includes a molding machine controller 3 that comprises at least a mold clamping device Mc for enabling natural compression of the resin R as the resin R solidifies inside mold 2, a specific molding condition setting function Fc for setting a specific molding condition Dc by obtaining a molding injection pressure Pi that becomes an injection pressure capable of molding a good product, a parting opening amount Lm and forms a predetermined gap between the movable mold 2m and the fixed mold 2c of mold 2 at the time of injection filling, and a molding clamping force Pc that becomes a mold clamping force capable of molding a good product, a fast injection condition setting function Ff for setting a fast injection speed Vf from the start of injection, which is higher than the injection speed set by the specific molding condition Dc, and a fast injection section Zf for continuing the fast injection speed Vf, and a molding control function Fm for mold-clamping the mold clamping device Mc with the molding clamping force Pc, setting a molding injection pressure Pi to a limit pressure Ps, injecting and filling mold 2 with the resin R under the fast injection condition Df from the start of injection, and injecting and filling the resin R under the specific molding condition Dc when the fast injection section Zf ends.

According to a preferred embodiment of the present invention, the fast injection section Zf may be set by a time Δts. Suppose the set time Δts has elapsed during molding. In that case, the fast injection section Zf may be switched to a specific molding condition Dc. Furthermore, the fast injection section Zf may be set by a switching determination value Lms for the magnitude of the parting opening amount Lm. Suppose the magnitude of the detected parting opening amount Lm has reached the switching determination value Lms during molding. In that case, the fast injection section Zf may be switched to a specific molding condition Dc. Further, the fast injection section Zf may be set by the screw position Xs. When the screw position Xs is reached during molding, the fast injection section may be switched to the specific molding condition Dc. The molding injection pressure Pi and the molding clamping force Pc are preferably set so that the parting opening amount Lm is 0.03-0.3 mm when the gap between the movable mold 2m and the fixed mold 2c is maximum. On the other hand, the mold clamping device Mc may be a direct-pressure type hydraulic mold clamping device Mcs, displacing the movable mold 2m by the drive ram 11p of the mold clamping cylinder 11. Or, the mold clamping device Mc may use a mold clamping device Mct of a toggle-type which slidably mounts a movable board 15 which supports the movable mold 2m to tie bar 14 installed between the fixed board 12, which supports the fixed mold 2c, and a pressure-receiving board 13, installs a toggle link mechanism 16 between the pressure-receiving board 13 and the movable board 15, and open and close the movable mold 2m and the fixed mold 2c by driving the toggle-link mechanism 15 through drive mechanism 17, and may perform mold clamping in a non-lock-up state. Further, the mold clamping device Mc can be provided with a mold position detector 18 for detecting the parting opening amount Lm according to the relative positions of the movable mold 2m and the fixed mold 2c by attaching to mold 2. On the other hand, the molding machine controller 3 may be provided with a parting opening amount display function Fd for graphically displaying the parting opening amount Lm detected by the mold position detector 18 on the display 3d and may be provided with an error processing function Fe for performing predetermined error processing if the size of the parting opening amount Lm detected during molding reaches the error determination value Lmj set for the parting opening amount Lm. Further, the molding machine controller 3 may be provided with a mode switching function Fs capable of selectively switching between a specific molding mode in which the fast injection section Zf is a zero section and a fast molding mode in which the fast injection section Zf is a section other than the zero section.

Effects of the Invention

The injection molding method and the injection molding machine M according to the present invention have the following remarkable effects.

(1) A mold clamping device Mc capable of naturally compressing a resin R in a mold 2 as the resin R solidifies inside mold 2 is used, a parting opening amount Lm, which is a predetermined gap between the movable mold 2m and the fixed mold 2c of mold 2 is generated in advance during injection filling, and a molding injection pressure Pi that is an injection pressure capable of molding a good product and a molding clamping force Pc that is a mold clamping force capable of molding a good product are determined in advance to set a specific molding condition Dc, a fast injection speed Vf from the start of injection, which is higher than the injection speed set by the specific molding condition Dc, and a fast injection section Zf for continuing the fast injection speed Vf are set as a fast injection condition Df, mold 2 is mold-clamped by the molding clamping force Pc and the molding injection pressure Pi is set as a limit pressure Ps during molding, mold 2 is injected and filled with a resin R under the fast injection condition Df from the start of injection, and the resin R is injected and filled under the specific molding condition Dc when the fast injection section Zf ends, then to take out a molded product G from mold 2 when a predetermined cooling time has elapsed, at the initial stage of filling, the resin R can be injected and filled to, for example, near the end of mold 2 under the fast injection condition Df, and then injected and filled under the specific molding condition Dc. Therefore, even in the case of a large molded product having a long flow length of the resin R, a short defect occurring at the end portion can be avoided, and as in the case of a small-sized or medium-sized molded product, high-quality and highly uniform molding can be performed by utilizing the advantages of the specific molding method based on the specific molding conditions Dc, and the molding cycle can be made high cycle based on the substantial shortening of the injection filling time.

(2) According to the preferred embodiment, when the fast injection section Zf is set, if the fast injection section Zf is set by the time Δts, and if the set time Δts has elapsed during molding, the fast injection section Zf is switched to the specific molding condition Dc, or if the fast injection section Zf is set by the screw position Xs, and if the set screw position Xs has been reached during molding, the fast injection section Zf is switched to the specific molding condition Dc, the optimum switching point (switching time or switching position) at which the fast injection section Zf is switched to the specific molding condition Dc can be set in advance that the control can be facilitated and stabilized, and the fast injection section Zf can contribute to the improvement of uniformity of molding quality.

(3) According to the preferred embodiment, when setting the fast injection section Zf, by setting the fast injection section Zf according to the switching determination value Lms for the size of the parting opening amount Lm, detecting the parting opening amount Lm during molding and switching to the specific molding condition Dc when the size of the detected parting opening amount Lm reaches the switching determination value Lms, it is possible to switch to the specific molding condition Dc based on the size of the parting opening amount Lm during actual molding, so that it is always possible to switch to the specific molding condition Dc in a stable state of the resin pressure, thereby improving the molding quality for each shot and reducing molding defects.

(4) According to the preferred embodiment, when the molding injection pressure Pi and the molding clamping force Pc are set so that the parting opening amount Lm at the maximum time between the movable mold 2m and the fixed mold 2c is 0.03-0.3 mm, it can be ensured to eliminate molding defects and release the gas, and the parting opening amount Lm can be set as a reference so that setting relating to the parting opening amount Lm can be facilitated and easily optimized.

(5) According to the preferred embodiment, if the mold clamping device Mc is provided with a direct-pressure type hydraulic mold clamping device Mcs that displaces the movable mold 2m by the drive ram 11p of the mold clamping cylinder 11, the mold clamping device Mc can perform natural compression on the resin R in mold 2 by directly utilizing the hydraulic behavior of the mold clamping device Mc itself so that good natural compression can be reliably performed and the control can be facilitated.

(6) According to the preferred embodiment of the present invention, the movable board 15 supporting the movable mold 2m is slidably mounted on a mold clamping device Mc in a tie bar 14 installed between the fixed board 12 supporting the fixed mold 2c and the pressure-receiving board 13, the toggle link mechanism 16 is disposed between the pressure-receiving board 13 and the movable board 15, and a toggle-type mold clamping device Mct for opening and closing the movable mold 2m and the fixed mold 2c by driving the toggle link mechanism 16 by a drive mechanism 17 is used, and mold clamping is performed in a non-lock-up state, then natural compression becomes possible by mold clamping in a non-lock-up state even in a toggle-type mold clamping device Mct for which natural compression cannot be realized in an original mode of use, so that the injection molding method according to the present invention can be effectively realized and the various effects described above based on the injection molding method can be enjoyed.

(7) According to the preferred embodiment, when the mold position detector 18 for detecting the parting opening amount Lm according to the relative positions of the movable mold 2m and the fixed mold 2c by attaching mold 2 to the mold clamping device Mc, the size of the parting opening amount Lm can be directly detected so that it is possible to obtain accurate parting opening amount Lm in which error factors other than the mold position detector 18 are eliminated as much as possible, and data related to the change thereof.

(8) According to the preferred embodiment, if the molding machine controller 3 is provided with the parting opening amount display function Fd for graphically displaying the parting opening amount Lm detected by the mold position detector 18 on the display 3d, it is possible to easily and effectively monitor the state related to the change of the parting opening amount Lm of mold 2 visually, and it is also possible to display the parting opening amounts Lm for each shot in an overlapping manner, so that it is possible to easily grasp the fluctuation state, and the like.

(9) According to the preferred embodiment, if the molding machine controller 3 is provided with the error processing function Fe for performing the predetermined error processing if the size of the parting opening amount Lm detected during molding reaches the error determination value Lmj set for the parting opening amount Lm, it is possible to quickly detect that an abnormally high resin pressure has occurred in mold 2, so that it is possible to quickly perform error processing such as operation stop, thereby preventing damage to mold 2.

(10) According to the preferred embodiment, if the molding machine controller 3 is provided with the mode switching function Fs capable of selectively switching between the specific molding mode in which the fast injection section Zf is a 0 section or the fast molding mode in which the fast injection section Zf is a section other than the 0 section, a single injection molding machine M can perform high-quality and high-homogeneity molding for a wide range of sizes of molded products, from small molded products to large molded products, utilizing the advantages of the specific molding method based on the specific molding conditions Dc, and can provide an optimal injection molding method with excellent versatility and developability for the user.

BRIEF DESCRIPTION OF THE DRAWINGS

FIG. 9 is a configuration diagram of the mold clamping device according to the modification of the injection molding machine of the present invention;

DESCRIPTION OF REFERENCE NUMERALS

2: mold, 2c: fixed mold, 2m: movable mold, 3: molding machine controller, 3d: display, 11: mold clamping cylinder, 11p: drive ram, 12: fixed board, 13: pressure-receiving board, 14: tie bar, 15: movable board, 16: toggle link mechanism, 17: drive mechanism unit, 18: mold position detector, G: molded product, M: injection molding machine, Mc: mold clamping device, Mcs: hydraulic mold clamping device, Mct: mold clamping device of toggle system, Mi: injection device, R: resin, Lm: parting opening amount, Lms: switching determination value, Lmj: error determination value, Pi: molding injection pressure, Pc: molding clamping force, Dc: specific molding condition, Df: fast injection condition, Vf: fast injection speed, Zf: fast injection section, Fc: specific molding condition setting function, Ff: fast injection condition setting function, Fm: molding control function, Fd: parting opening amount display function, Fe: error processing function, Fs: mode switching function

BEST MODE FOR CARRYING OUT THE INVENTION

Next, best embodiments of the present invention will be described in detail with reference to the drawings.

First, the overall configuration of the injection molding machine M capable of implementing the injection molding method according to the present embodiment will be described with reference to FIG. 3.

Figure 3:
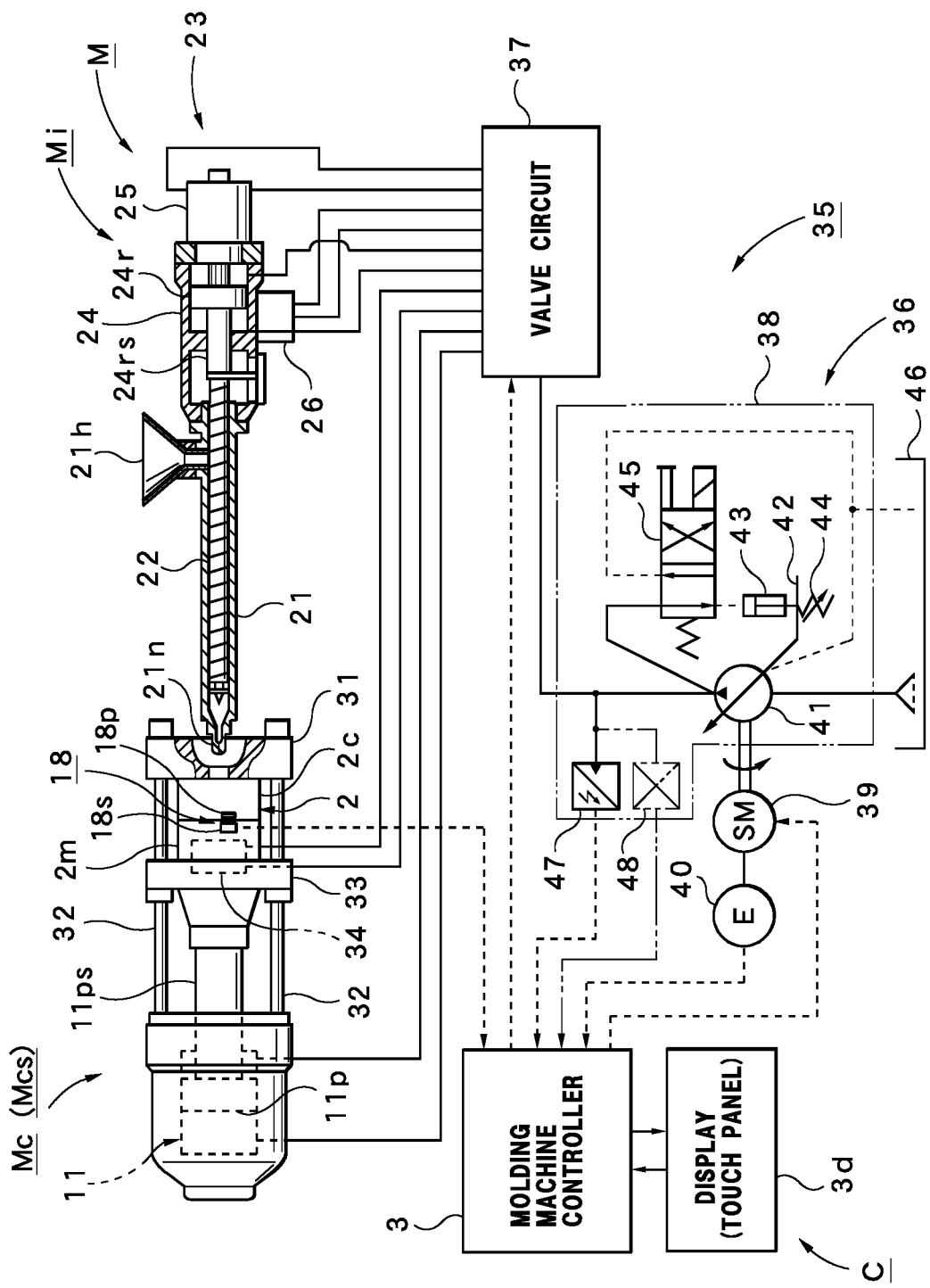
FIG. 3 is a block diagram of the injection molding machine capable of performing the injection molding method.
Figure 8A:
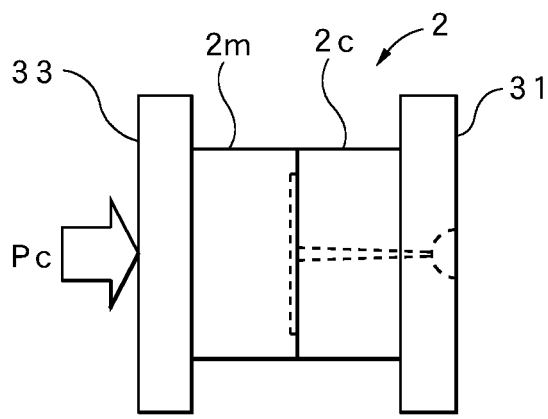
FIG. 8a is a schematic diagram showing a state of a mold during molding in the injection molding machine.
Figure 8B:
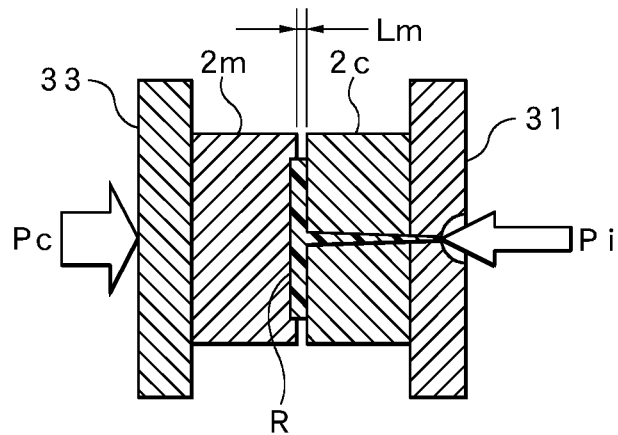
FIG. 8b is a schematic diagram showing another state of the mold during molding in the injection molding machine.
Figure 8C:
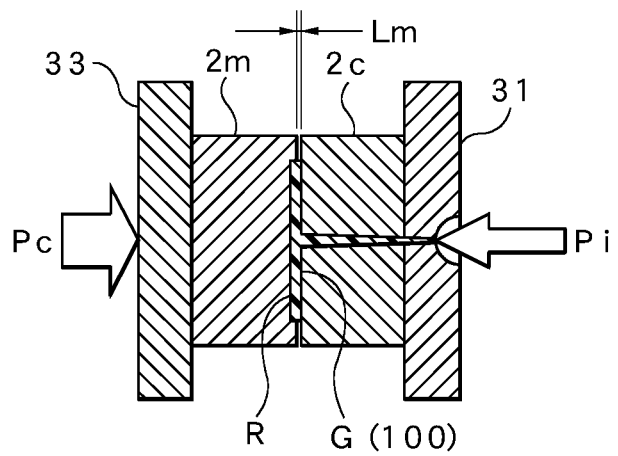
FIG. 8c is a schematic diagram showing another state of the mold during molding in the injection molding machine.

In FIG. 3, M denotes the injection molding machine comprising an injection device Mi and a mold clamping device Mc. The injection device Mi comprises a heating cylinder 21 having an injection nozzle 21n at the front end and a hopper 21h at the rear end. A screw 22 is inserted into the heating cylinder 21. A screw drive section 23 is arranged at the rear end of the heating cylinder 21. The screw drive section 23 is provided with an injection cylinder (hydraulic cylinder) 24, including one-rod type injection ram 24r. A ram rod 24rs projecting forward of the injection cylinder 24 is coupled to the rear end of the screw 22. A shaft of a metering motor (oil motor) 25 attached to the injection cylinder 24 is spline-coupled to the rear end of the injection ram 24r. Reference numeral 26 denotes an injection device moving cylinder for moving the injection device Mi forward and backward to touch or release the nozzle with respect to mold 2. As a result, the injection device Mi can touch the injection nozzle 21n to mold 2 to inject and fill the cavity of mold 2 with the molten (plasticized) resin R (FIGS. 8a-8c).

On the other hand, as the mold clamping device Mc, a mold clamping device can naturally compress at least the resin R inside mold 2 as the resin R solidifies is used. The exemplified mold clamping device Mc is a direct-pressure-type hydraulic mold clamping device Mcs which displaces the movable mold 2m by the drive ram 11p of the mold clamping cylinder (hydraulic cylinder) 11. Using the direct-pressure-type hydraulic mold clamping device Mcs as described above, enables natural compression on the resin R in mold 2 by directly utilizing the hydraulic behavior of the mold clamping device Mc itself.

A more specific configuration of the illustrated mold clamping device Mcs includes a fixed board 31 disposed apart from the mold clamping cylinder 11 and fixed in position, a plurality (four) of tie bars 32 extending between the fixed board 31 and the mold clamping cylinder 11. A movable board 33 loaded so as to be slidable on the tie bars 32. The tip of the ram rod 11ps projecting forward from the mold clamping cylinder 11 is fixed to the movable board 33. Then, the movable mold 2m is attached to the movable board 33, and the fixed mold 2c is attached to the fixed board 31. The fixed mold 2c and the movable mold 2m constitute mold 2. As a result, the mold clamping cylinder 11 can open, close, and clamp mold 2. Reference numeral 34 denotes an ejector cylinder for ejecting the molded product G (FIG. 8c) attached to the movable mold 2m when mold 2 is opened.

On the other hand, reference numeral 35 denotes a hydraulic circuit, which includes a variable discharge type hydraulic pump 36 serving as a hydraulic drive source and a valve circuit 37. The variable discharge type hydraulic pump 36 includes a pump unit 38 and a servo motor 39 for rotationally driving the pump unit 38. Reference numeral 40 denotes a rotary encoder for detecting the rotational speed of the servo motor 39. The pump unit 38 incorporates a pump body 41 composed of a swash plate-type piston pump. Therefore, pump section 38 includes the swash plate 42. When the inclination angle (swash plate angle) of the swash plate 42 increases, the stroke of the pump piston in the pump body 41 increases, and the discharge flow rate increases. When the inclination angle (swash plate angle) of the swash plate 42 decreases, the stroke of the pump piston in the pump body 41 decreases, and the discharge flow rate decreases. Therefore, setting the swash plate angle to a predetermined angle can set a fixed discharge flow rate at which the discharge flow rate (maximum capacity) is fixed to a predetermined size. The swash plate 42 is provided with a control cylinder 43 and a return spring 44, and the control cylinder 43 is connected to the discharge port of the pump unit 38 (pump body 41) via a switching valve (electromagnetic valve) 45. Thus, the angle of the swash plate 42 (swash plate angle) can be changed by controlling the control cylinder 43.

Further, the suction port of the pump section 38 is connected to the oil tank 46. The discharge port of pump section 38 is connected to the primary side of the valve circuit 37. The secondary side of valve circuit 37 is connected to the injection cylinder 24, the metering motor 25, the mold clamping cylinder 11, the ejector cylinder 34, and the injection device moving cylinder 26 in the injection molding machine M. Therefore, valve circuit 37 includes switching valves (electromagnetic valves) connected to the injection cylinder 24, the metering motor 25, the mold clamping cylinder 11, the ejector cylinder 34, and the injection device moving cylinder 26, respectively. Each switching valve is composed of one or more valve parts and necessary auxiliary hydraulic parts and has at least switching functions related to supply, stop, and discharge of working fluid to the injection cylinder 24, the metering motor 25, the mold clamping cylinder 11, the ejector cylinder 34, and the injection device moving cylinder 26.

Thus, variably controlling the rotational speed of the servo motor 39 can vary the discharge flow rate and the discharge pressure of the variable discharge type hydraulic pump 36, enabling the drive control of the injection cylinder 24, the metering motor 25, the mold clamping cylinder 11, the ejector cylinder 34 and the injection device moving cylinder 26, and the control of each operation step in the molding cycle. As described above, the variable discharge type hydraulic pump 36 capable of setting a fixed discharge flow rate by changing the swash plate angle can set the pump capacity to a fixed discharge flow rate (maximum capacity) of a predetermined size. The discharge flow rate and discharge pressure can be changed based on the fixed discharge flow rate, facilitating smooth control by the control system.

Next, the configuration of the control system C provided in the injection molding machine M having the above-described mechanical configuration is described with reference to FIGS. 3-5.

Figure 4:
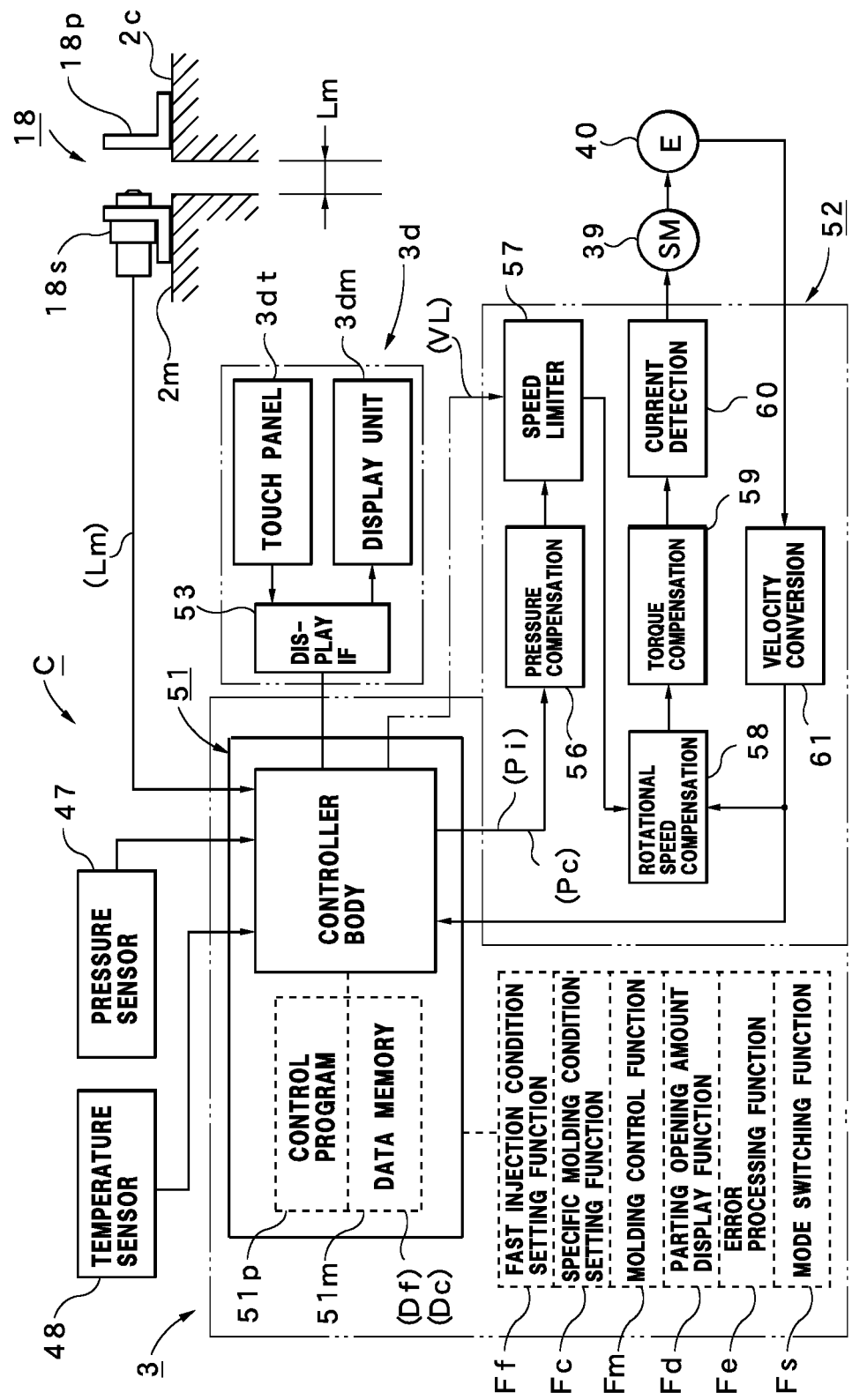
FIG. 4 is a block diagram of the control system of the injection molding machine.

The control system C includes a molding machine controller 3 shown in FIG. 4, which includes a controller body 51. The controller body 51 has a computer function, including hardware such as a CPU and an internal memory. Therefore, the internal memory stores a control program (software) 51$p$ for executing various control processes, including various arithmetic processes and sequence control processes. The internal memory also includes a data memory 51$m$ capable of storing various data, including a database.

In particular, the control program 51$p$ includes a control program for executing the injection molding method according to the present embodiment and drives hardware such as the CPU and the internal memory to realize various functions related to the injection molding method, namely, a fast injection condition setting function Ff, a specific molding condition setting function Fc, a molding control function Fm, a parting opening amount display function Fd, the error processing function Fe, and a mode switching function Fs shown in FIG. 4. Specific contents of these functions are described later.

On the other hand, the mold position detector 18 is attached to the outer surface of mold 2, and the mold position detector 18 is connected to the controller body 51. The mold position detector 18 has a function of detecting the relative positions of the movable mold 2$m$ and the fixed mold 2$c$, i.e., the size of the parting opening amount Lm. It can be constituted by, for example, a combination of a reflecting plate 18$p$ attached to the fixed mold 2$c$ (or movable mold 2$m$) and a reflective ranging sensor 18$s$ attached to the movable mold 2$m$ (or fixed mold 2$c$) for projecting light or radio waves onto the reflecting plate 18$p$ for ranging, as shown in FIGS. 3 and 4. At this time, when installing the mold position detector 18 on the upper surface of mold 2, it is desirable to place it near the center in the lateral direction. When installing it on the side surface of mold 2, it is desirable to place it near the center in the vertical direction. Since using such a mold position detector 18 enables direct detection of the size of the parting opening amount Lm, there is an advantage that it is possible to obtain accurate parting opening amount Lm, eliminating error factors other than the mold position detector 18 as much as possible, and data relating to the change thereof.

The molding machine controller 3 includes a display 3$d$. The display 3$d$ includes a display body 3$dm$ and a touch panel 3$dt$ attached to the display body 3$dm$. The display body 3$dm$ and the touch panel 3$dt$ are connected to the controller body 51 via a display interface 53. Therefore, the touch panel 3$dt$ allows various setting operations and selection operations. The display 3$d$ shows various displays, particularly a setting screen Vs related to injection and measurement shown in FIGS. 5 and 6 in relation to the injection molding method according to the present embodiment.

Figure 5:
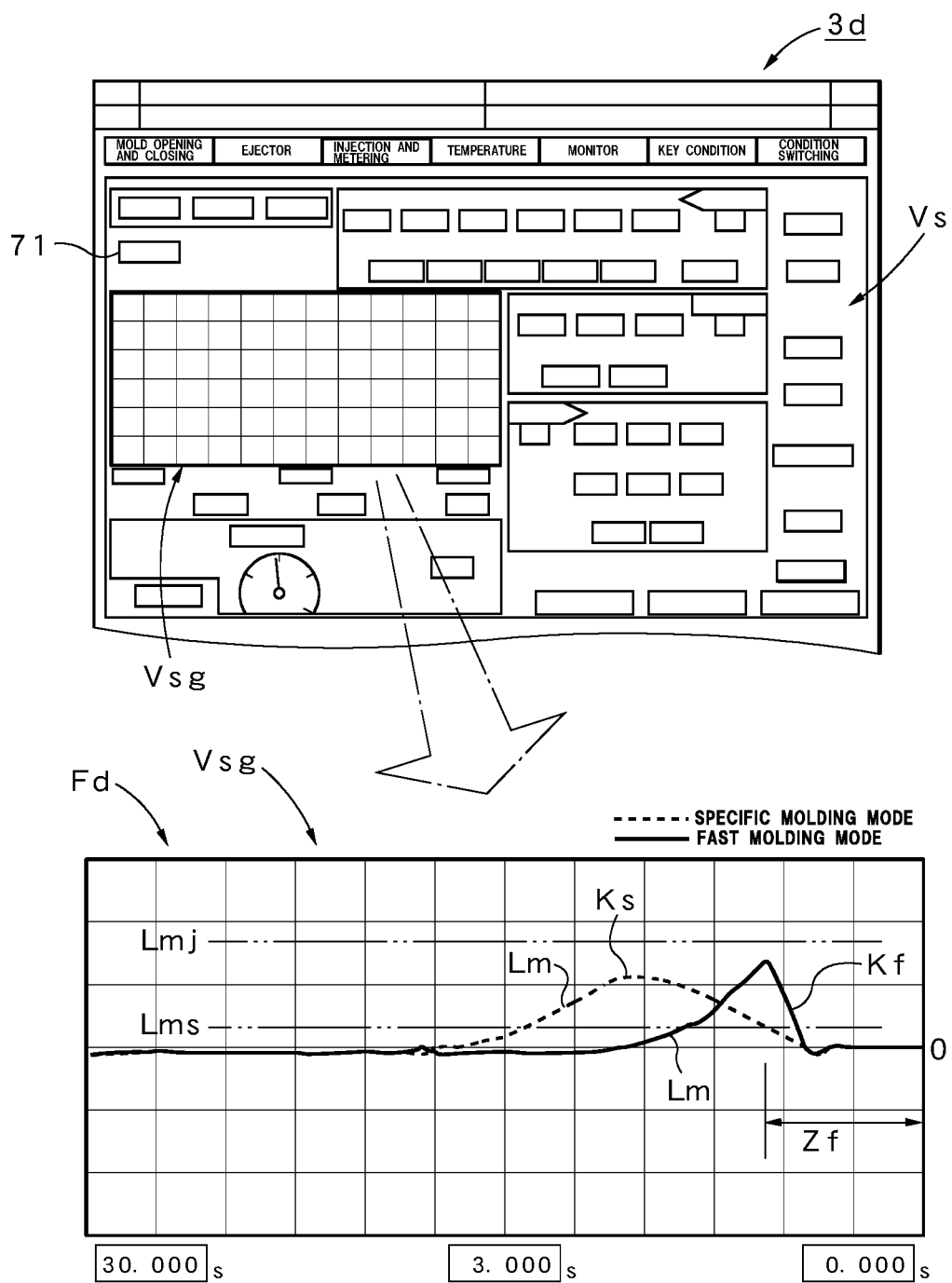
FIG. 5 is a set screen view including an enlarged extraction view of a graphic display in a display provided in the injection molding machine.

As shown in FIG. 5, the setting screen Vs is provided with a waveform display unit Vsg for graphically displaying the temporal change of the parting opening amount Lm. The waveform display unit Vsg can display the change data of the parting opening amount Lm detected by the mold position detector 18 at least from the start of injection into mold 2 to the end of cooling of mold 2 (end of cooling time). In the waveform display unit Vsg, the horizontal axis represents the time [second] axis. The vertical axis represents the parting opening amount Lm [mm]. This display function becomes a parting opening amount display function Fd. Providing the parting opening amount display function Fd for graphically displaying the parting opening amount Lm detected by the mold position detector 18 on the display 3$d$ facilitates effective visual monitor of the state related to the change of the parting opening amount Lm of mold 2. It is also possible to display the parting opening amounts Lm for each shot in an overlapping manner allowing for easily grasping the variation state, and the like.

Further, the servo amplifier 52 shown in FIG. 4 is attached to the molding machine controller 3. The servo motor 39 described above is connected to the output unit of the servo amplifier 52. The rotary encoder 40 is connected to the encoder pulse input unit of the servo amplifier 52. As shown in FIG. 3, the above-described valve circuit 37 is connected to the control signal output port of the molding machine controller 3.

The servo amplifier 52 includes a pressure compensating section 56, a speed limiter 57, a rotational speed compensating unit 58, a torque compensating unit 59, a current detecting unit 60, and a speed converting unit 61. A molding injection pressure Pi (limit pressure Ps) or a molding clamping force Pc is applied to the pressure compensating section 56 from the controller body 52. A speed limit value VL is applied to the speed limiter 57. As a result, the pressure-compensated speed command value is outputted from the pressure compensation unit 56 and is given to the speed limiter 57. The speed command value is limited by the limit pressure Ps. The speed command value output from the speed limiter 57 is limited by the speed limit value VL. Further, the speed command value outputted from the speed limiter 57 is given to the rotation speed compensator 58. The torque command value outputted from the rotation speed compensator 58 is given to the torque compensator 59. The motor drive current outputted from the torque compensator 59 is supplied to the servo motor 39 to drive the servo motor 39. The encoder pulse obtained from the rotary encoder 40 is converted into a speed detection value by the speed conversion unit 61 and applied to the controller main body 51 and also applied to the rotation speed compensation unit 58, thereby performing feedback control of the minor loop with respect to the rotation speed.

A pressure sensor 47 for detecting the hydraulic pressure and a temperature sensor 48 for detecting the oil temperature are provided on the primary side of the valve circuit 37 in the hydraulic circuit 35. The mold position detector 18, the pressure sensor 47, and the temperature sensor 48 are connected to the sensor support of the molding machine controller 3, respectively.

Next, an injection molding method according to the present embodiment using such an injection molding machine M will be specifically described with reference to FIGS. 1-10.

The injection molding method according to the present embodiment basically performs a molding operation according to a specific molding method. The specific molding method is the method already proposed by the present applicant in the aforementioned WO2011/161899 publication. On the other hand, in this specific molding method, it is possible to perform good molding for a small or medium-sized molded product as described above. However, good molding isn't easy for a large molded product. The present invention makes it possible to mold even this large molded product satisfactorily.

Figure 2:
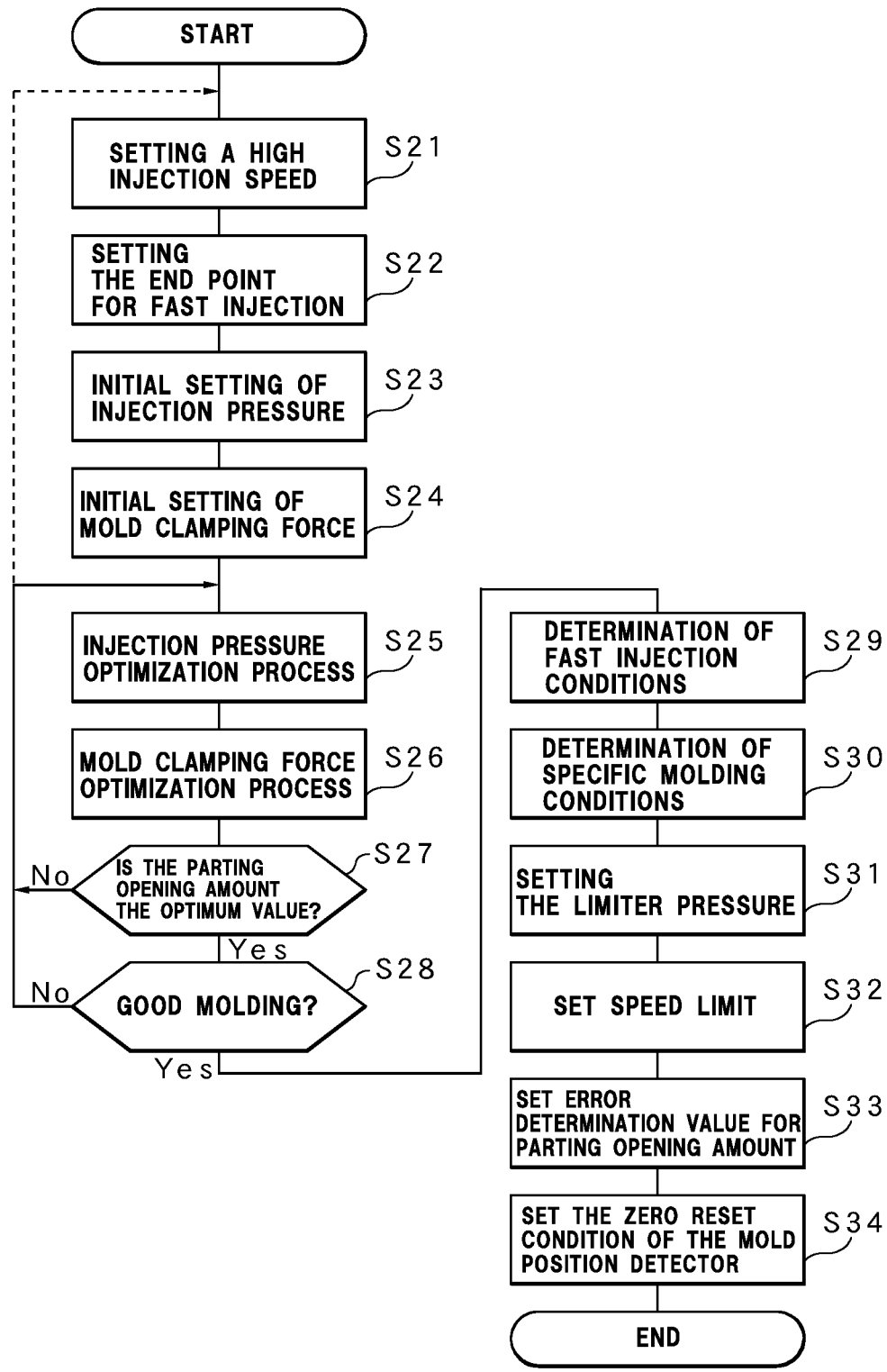
FIG. 2 is a flowchart for explaining the processing procedure for setting molding conditions when molding is performed by the injection molding method.

First, a processing procedure at the time of setting in the injection molding method according to the present embodiment will be described with reference to FIGS. 5-7 regarding a flowchart shown in FIG. 2.

Figure 10:
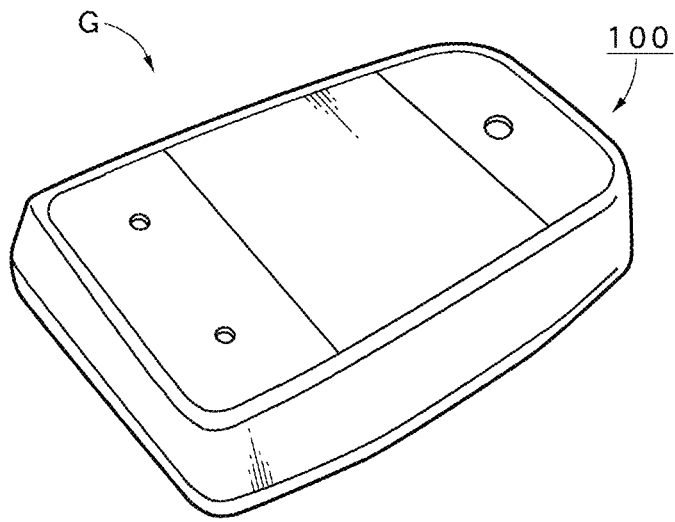
FIG. 10 is an external perspective view showing an example of a large molded product molded by the same injection molding method.

The exemplified embodiment shows a case where the large molded product 100 shown in FIG. 10 is molded as the molded product G. The width of this large molded product 100 is about 1 [m].

First, the fast injection condition Df is set. The fast injection condition Df can be set by the fast injection condition setting function Ff. The setting at this stage is provisional. In setting, touching the mode switching key 71 on the setting screen Vs related to injection and measurement shown in FIG. 6 switches to the fast mode. It is possible to return to the specific molding mode by touching the key again. Switching to the fast mode displays the fast injection setting screen Vsw shown in FIG. 6 in the window.

The fast injection condition Df includes at least a fast injection speed Vf and a fast injection section Zf for continuing the fast injection speed Vf. The fast injection speed Vf is an injection speed from the start of injection and is set to be higher than an injection speed (for example, 80 [mm/s]) set by a specific molding condition Dc described later (step S21).

Figure 6:
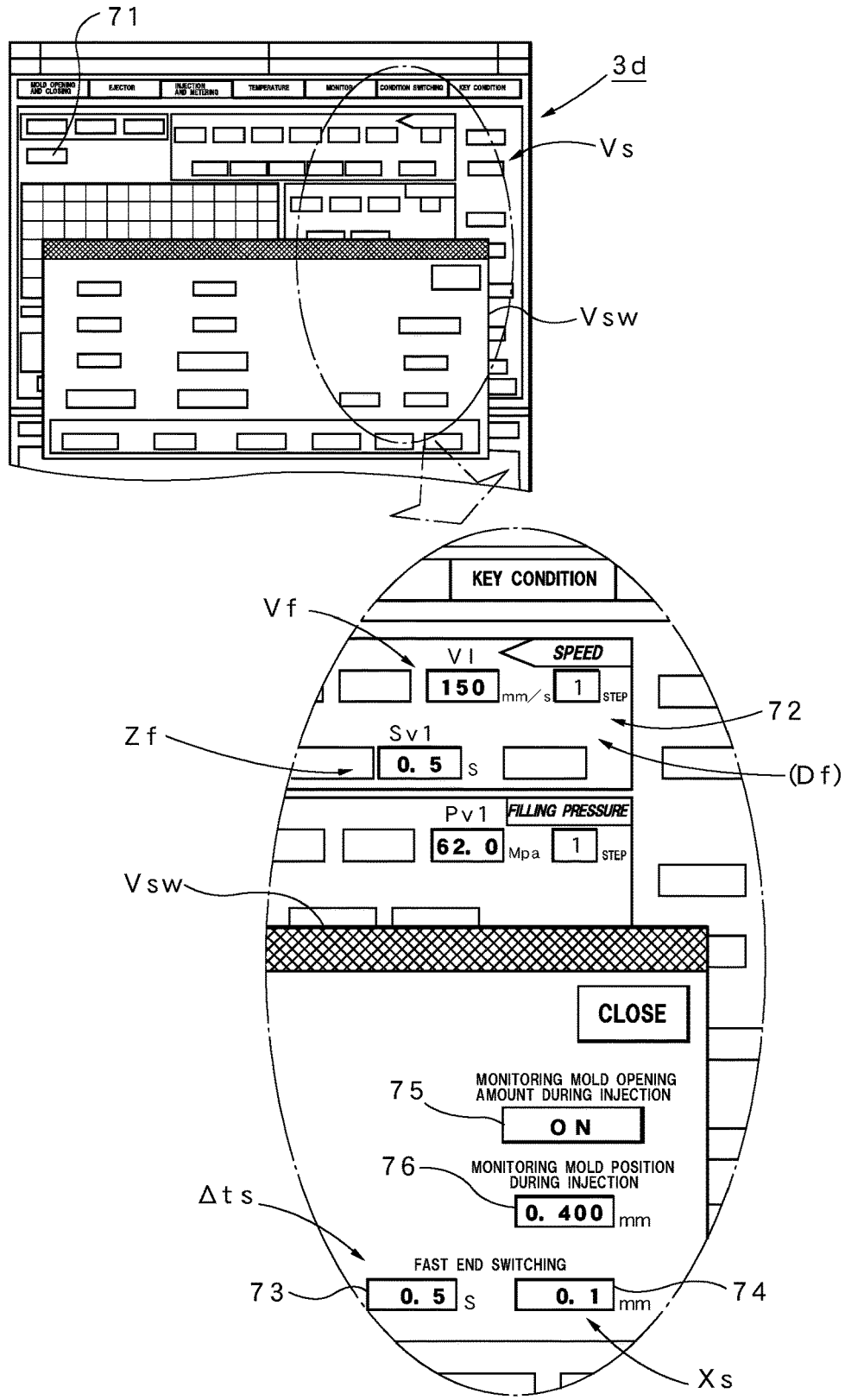
FIG. 6 is a partially enlarged extracted view of the setting screen in the display;]

In settings, touching the speed input frame V1 for setting the injection speed of the first stage in the speed setting unit 72 shown in FIG. 6 displays a numeric keypad screen (not shown), allowing for inputting the numerical value of the fast injection speed Vf using this numeric keypad screen. FIG. 6 shows a case inputting the injection speed 150 [mm/s]. Although the example shows the case setting fast injection speed Vf in one step. However, the case setting it in several steps is not excluded.

Next, a fast injection section Zf for continuing the fast injection speed Vf is set. In the fast mode, the end point (switching point) of the fast injection section Zf is set to shift to injection filling of the resin R under the specific molding condition Dc via the fast injection section Zf (step S22). Three physical quantities, i.e., the time Δts from the injection start ts, the screw position Xs from the injection start ts, and the switching determination value Lms for the size of the parting opening amount Lm can set the end point. The exemplified case allows for a setting with fast injection setting screen Vsw displayed in the window.

In this case, setting it by the time Δts switches the molding condition to the specific molding condition Dc by the lapse of the set time Δts during molding. Further, setting it by the screw position Xs switches the molding condition to the specific molding condition Dc when the screw position reaches the set screw position Xs during molding. In either case, although the monitoring objects (physical quantities) are different, the basic setting method is the same. These setting methods enable setting the optimum switching point (switching time or switching position) in advance for switching to the specific molding condition Dc, which provides the advantage of facilitating and stabilizing the control and improving the uniformity of molding quality.

FIG. 6 shows a case where the time Δts is set from the time input field 73 of the fast injection setting screen Vsw, and the example time Δts is 0.5 [second]. The setting using the fast injection setting screen Vsw is reflected in the first stage time input field Sv1 in the speed setting unit 72. The fast injection setting screen Vsw shown in FIG. 6 also shows a case for setting the screw position Xs using the position input field 74. By setting switching points using a plurality of physical quantities in this manner, it is possible to select and use switching points as required. In FIG. 6, reference numeral 75 denotes a mold opening amount monitoring key during injection, enabling switching between monitoring ON and OFF. Reference numeral 76 denotes an input field of the monitoring mold position during the injection.

Further, when the switching point is set by the switching determination value Lms, the detected parting opening amount Lm is monitored during molding. When the parting opening amount Lm reaches the switching determination value Lms, the molding condition is switched to the specific molding condition Dc. FIG. 5 shows an example of the switching determination value Lms. By using this setting method, it is possible to switch to the specific molding condition Dc based on the size of the parting opening amount Lm at the time of actual molding so that it is possible to switch to the specific molding condition Dc at all times in a state where the resin pressure is stable. There is an advantage that molding quality can be improved for each shot, and molding defects can be reduced.

Next, specific molding conditions Dc are set. The specific molding condition Dc can be set by the specific molding condition setting function Fc. The specific molding condition Dc includes a molding injection pressure Pi that produces the parting opening amount Lm that forms the predetermined gap between the movable mold 2m and the fixed mold 2c of mold 2 at the time of injection filling and provides an injection pressure capable of molding a good product and also includes a molding clamping force Pc that provides a mold clamping force capable of molding a good product.

Hereinafter, a procedure for setting the specific molding condition Dc is specifically described. First, the injection pressure at the injection device Mi side is initially set (step S23). The injection pressure at this time can be set based on the capability (driving force) of the injection device Mi. Since the injection pressure, in this case, need not be accurately determined as an absolute value, the magnitude of the hydraulic pressure detected by the pressure sensor 47 in the hydraulic circuit 35 connected to the injection cylinder 21 may be used, or the injection pressure converted by calculation may be used.

The mold clamping force on the mold clamping device Mc side is initially set (step S24). The mold clamping force at this time can be set based on the capability (driving force) of the mold clamping device Mc. In this case, since it is not necessary to accurately calculate the mold clamping force as an absolute value, the magnitude of the hydraulic pressure detected by the pressure sensor 47 in the hydraulic circuit 35 connected to the mold clamping cylinder 11 may be used, or the mold clamping force converted by calculation may be used.

The hydraulic circuit 35 is switched to the mold clamping device Mc side by the valve circuit 37 during mold clamping and functions as a hydraulic circuit on the mold clamping device Mc side. It is switched to the injection device Mi side by the valve circuit 37 during injection and functions as a hydraulic circuit on the injection device Mi side. Suppose the hydraulic pressure in hydraulic circuit 35 is used when determining the injection pressure and the mold clamping force. In that case, it is possible to set the molding clamping force Pc easily and the molding injection pressure Pi to be described later.

Then, the molding injection pressure Pi to be used during production is obtained by the optimization processing on the initially set injection pressure. The molding clamping force Pc to be used during production is obtained by performing the optimization processing on the initially set mold clamping force (steps S25 and S26).

An example of a method for optimizing the mold clamping force and injection pressure will be described with reference to FIG. 7. First, trial molding is performed using the initially set mold clamping force and injection pressure. Specifically, when turning on a molding start key (not shown), mold clamping operation is performed, and trial molding by mold 2 is performed according to the initially set conditions. In the example, the initial mold clamping force is 40 kN. FIG. 7 shows the results of trial molding using the initial mold clamping force (40 [kN]) and injection pressure.

The change characteristic of the dotted line Ks in FIG. 5 shows the change in the size of the parting opening amount Lm during molding under the specific molding condition Dc. In this case, the size of the parting opening amount Lm gradually increases during the injection filling. When the injection filling is complete, the resin is cooled. It gradually becomes smaller due to the natural compression action of the mold clamping device Mc. Therefore, suppose the size of the parting opening amount Lm is within an appropriate range. Then the degassing and the compression (natural compression) of the resin R are well performed, and the gaps (residual gaps) within an appropriate range are generated after cooling. In the dotted line Ks shown in FIG. 5, a minus region is generated in some portion. This is due to the inclination of the mold position detector 18 because the central portion of mold 2 expands more than the outer portion when the resin R fills mold 2.

Figure 7:
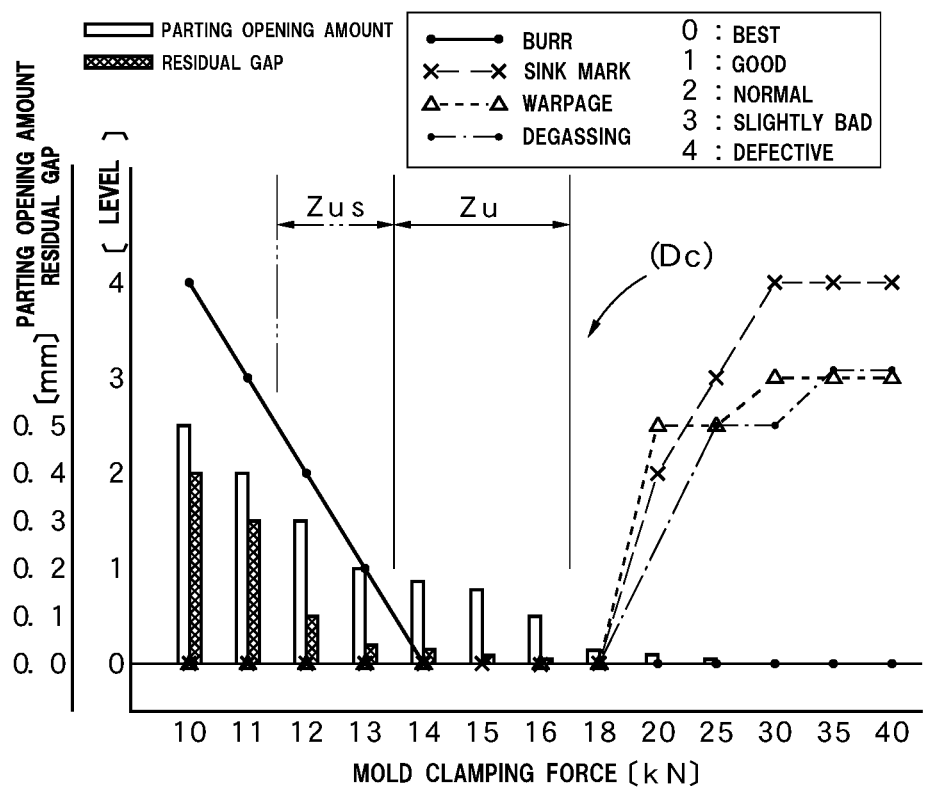
FIG. 7 is a data graph showing a result of the quality of a molded product with respect to a mold clamping force for explaining a process for setting molding conditions used in the injection molding method.

On the other hand, FIG. 7 shows that with the mold clamping force of 40 [kN], the parting opening amount Lm is 0, and the residual gap is 0. In this case, the parting opening amount Lm is the maximum opening amount generated during injection filling. The residual gap is the residual opening amount when a predetermined cooling period has elapsed after injection filling. When the mold clamping force is 40 [kN] since it is a significant value, it is at level 0 (best) where burrs do not occur, sink marks are at level 4 (defective), warpage is at level 3 (slightly bad), and degassing indicates level 3 (slightly bad).

After that, as shown in FIG. 7, the mold clamping force and the magnitude of the injection pressure are gradually reduced, and trial molding is performed in each step, thereby measuring the parting opening amount and the residual gap between the fixed mold 2c and the movable mold 2m, and observing the quality of the molded product G (see FIG. 8c) (steps S27 and S28).

Although no injection pressure data is shown in FIG. 7, the injection pressure can be optimized by setting a minimum value that can be set or a value close to the minimum value as the molding injection pressure Pi on the condition that a parting opening amount Lm is generated between the movable mold 2m and the fixed mold 2c during injection filling, and good molding is possible (step S25). Specifically, as shown in FIG. 7, when the mold clamping force is reduced, the injection pressure is also appropriately reduced, and the size before the resin R does not normally fill mold 2 can be selected.

According to the result shown in FIG. 7, when the mold clamping force is 14, 15, and 16 [kN] in the range Zu, the parting opening amount Lm satisfies the range of 0.03-0.20 [mm]. Further, the level is 0 (best) at which any defect of burrs, sink marks, or warpage does not occur, and the level of degassing is 0 (best), satisfying the condition of obtaining a good molded product. Therefore, the molding clamping force Pc may be selected from three mold clamping forces of 14, 15, and 16 [kN], and the selected mold clamping force can be set as the molding clamping force Pc at the time of mold clamping in mold 2 during production (step S26).

Further, in the case of FIG. 7, when the parting opening amount Lm satisfies the allowable range of 0.03-0.20 [mm], it is possible to obtain the best-molded product without generating burrs. However, burrs are removable after taking out the molded product. Further, there are not a few cases where a product, even with a small number of burrs, is useable as a good product. Therefore, as shown in FIG. 7, a low degree of burr generation indicated by level 1 (good) or level 2 (normal) does not necessarily result in a defective product. Therefore, considering the data shown in FIG. 7, it is possible to select a mold clamping force of 12 and 13 [kN] in the range Zus indicated by the imaginary line, depending on the type of the molded product, or the like. Therefore, if the parting opening amount Lm satisfies the allowable range of 0.03-0.30 mm, a good molded product is obtainable.

In this way, the molding injection pressure Pi and the molding clamping force Pc can be set so that the parting opening amount Lm between the movable mold 2m and the fixed mold 2c is 0.03-0.30 [mm] at the maximum. This setting eliminates molding defects and ensures good gas removal. Then it is possible to set the parting opening amount Lm as a reference, facilitating setting the parting opening amount Lm and optimizing it.

As shown in FIG. 7, when the parting opening amount Lm satisfies 0.03-0.30 mm, the residual gap (Lm) satisfies the allowable range of 0.01-0.10 mm. When the parting opening amount Lm satisfies 0.03-0.20 mm, the residual gap (Lm) satisfies the allowable range of 0.01-0.04 mm. Therefore, a more desirable determination can be made by adding the condition of the residual gap (Lm) to the condition of the parting opening amount Lm.

FIG. 7 is descriptive data for setting the molding clamping force Pc and the molding injection pressure Pi. Therefore, in an actual setting, for example, the molding clamping force Pc and the molding injection pressure Pi can be obtained by changing the mold clamping force several times, for example, by 40, 30, 20, 10, or the like. In this case, the operator may set the mold clamping force and the injection pressure arbitrarily. Or they may be automatically or semi-automatically determined while using the auto-tuning function provided in the injection molding machine M. The use of the auto-tuning function easily provides the mold clamping force immediately before the occurrence of burrs.

The above procedure provides the target molding injection pressure Pi and molding clamping force Pc. In obtaining the molding injection pressure Pi and the molding clamping force Pc, fine adjustments can be made to the above-described fast injection speed Vf and fast injection section Zf as necessary (steps S28 and S21). When the processing based on the above procedure is completed, the temporarily set fast injection speed Vf and fast injection section Zf (the end point of the fast injection speed Vf) are set as the final setting of the fast injection condition Df. The molding injection pressure Pi and the molding clamping force Pc are set as the final setting of the specific molding condition Dc (steps S29 and S30).

The obtained molding injection pressure Pi is set as a limiter pressure Ps with respect to the injection pressure at the time of production (step S31). On the other hand, a speed limit value VL for the injection speed of the injection device Mi is set (step S32). It is not always necessary to set the speed limit value VL. However, setting the speed limit value VL provides mechanical protection of mold 2, the injection screw, and the like, even if the injection speed Vd becomes excessively high. Therefore, the speed limit value VL is set to a value capable of mechanically protecting mold 2, the injection screw, and the like.

On the other hand, the molding machine controller 3 is provided with the error processing function Fe for predetermined error processing if the size of the parting opening amount Lm detected during molding reaches an error determination value Lmj set for the parting opening amount Lm. Therefore, an error determination value Lmj for error determination is set (step S33). In the injection molding method according to the present embodiment, since the fast injection speed Vf is set, the excessive injection pressure is generated, and it is assumed that the parting opening amount Lm becomes abnormally large. Therefore, an error determination value Lmj for the parting opening amount Lm is set, and when the size of the detected parting opening amount Lm reaches the error determination value Lmj during molding, predetermined error processing is performed. As the error determination value Lmj, a value slightly larger than an upper limit value (0.03 [mm] in the example) of the parting opening amount Lm within the allowable range can be set. FIG. 5 shows an example of the error determination value Lmj.

Further, a zero-reset condition of the mold position detector 18 for detecting the parting opening amount Lm is set (step S34). Specifically, on the condition that at least a predetermined injection preparation after mold clamping by the mold clamping device Mc is completed during production, reset control is performed to reset the mold position detector 18 to zero when a preset reset timing is reached. Therefore, the timing for the reset control is set as a zero reset condition for the zero resetting. Usually, since the reset control for the zero resetting is performed during mold clamping of mold 2, at the closed position immediately after mold clamping, there is not a short injection waiting time. Since the set molding clamping force Pc is maintained for the injection waiting time, the parting opening amount Lm is not affected. However, during the injection waiting time, there are not a few external disturbance factors that cannot be ignored from obtaining an accurate parting opening amount Lm. The external disturbance factor becomes an error factor of the parting opening amount Lm.

Therefore, the reset timing for the reset control is set on the condition that the predetermined injection preparation after the mold clamping by the mold clamping device Mc is completed. In this case, the complete predetermined injection preparation includes at least one or both of the following conditions: the nozzle touch operation is complete, and the mold temperature reaches a stable state. The reset timing is set as one of the molding conditions related to one molding cycle, and reset control is performed for each shot. As a result, errors due to various external disturbance factors can be most effectively eliminated. The size of the parting opening amount Lm for each shot can always be accurately and stably collected.

Any other item is set, if necessary. The exemplary injection molding machine M has a correction function for correcting the molding clamping force Pc according to the oil temperature detected by the temperature sensor 48 in the hydraulic circuit 25. This correction function eliminates the effect of oil temperature on the molding clamping force Pc due to temperature drift, and the like. Since the molding clamping force Pc can always be kept constant, the accuracy and stability of the operation control can be further improved, and at the same time, it can contribute to the high quality and uniformity of the molded product. Therefore, a correction coefficient, or the like used for correction by the correction function can be applied to other necessary matters.

Figure 1:
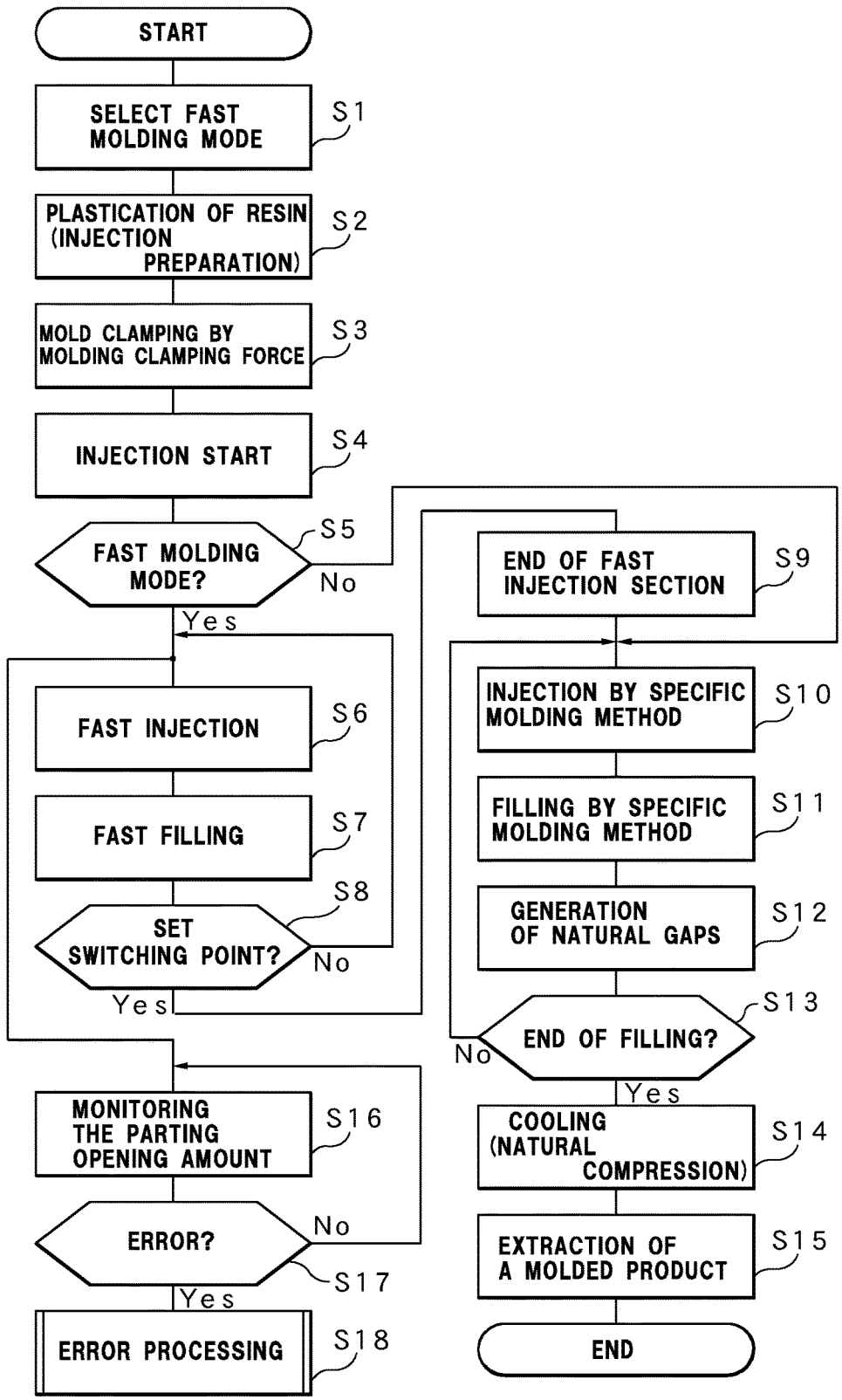
FIG. 1 is a flowchart for explaining the processing procedure during molding by the injection molding method according to the preferred embodiment of the present invention.

Next, a processing procedure during molding of the injection molding method according to the present embodiment is described with reference to the respective drawings and a flowchart shown in FIG. 1.

When molding, the selection of the fast mode is confirmed for the mode switching key 71 (step S1). Thus, during molding, the molding control function Fm in the molding machine controller 3 performs a series of controls in the injection molding method according to the present embodiment. That is, the molding clamping force Pc performs mold clamping, the molding injection pressure Pi is set to the limit pressure Ps, mold 2 is injected and filled with the resin R under the fast injection condition Df from the start of injection, and the resin R is injected and filled under the specific molding condition Dc after the end of the fast injection section Zf.

A specific processing procedure during molding will be described below. First, when the operator turns on the start key (not shown), the switching of the valve circuit 37 and the servo motor 39 are controlled. As a result, the metering motor 25 of the injection device Mi is driven to plasticize the resin R, thereby preparing the injection (step S2). In the injection molding method according to the present embodiment, unlike the general molding method, the measuring step of accurately measuring the resin R is not required. That is, in the injection step, the injection operation is performed only until the cavity is filled with the resin R so that it is sufficient to measure a somewhat large amount of the resin R in the measurement step.

Further, the mold clamping cylinder 27 of the mold clamping device Mc is driven and controlled to clamp mold 2 so that the mold clamping force becomes the molding clamping force Pc (step S3). FIG. 8a shows the state of mold 2 at this time. Upon completion of mold clamping, the nozzle touch operation controls the nozzle touch and mold temperature. The nozzle touch operation drives and controls the injection device moving cylinder 26, and moves forward and controls the injection device Mi to touch the nozzle with respect to mold 2. The control process for the mold temperature is controlled so that the mold temperature, which has changed due to mold opening, is controlled to the normal set temperature. Further, the molding machine controller 3 monitors whether or not the set reset timing has been reached. When the reset timing has been reached, zero reset processing is performed on the mold position detector 18.

When reaching the injection start timing, the injection operation starts (step S4). Since the fast mode is selected this time, in the injection operation, the injection cylinder 24 of the injection device Mi is drive-controlled by switching the valve circuit 37 and controlling the servo motor 39, and fast injection is performed at the fast injection speed Vf (steps S5 and S6). In the example, since 150 [mm/s] is set as the fast injection speed Vf, the screw 22 moves forward at a high speed of 150 [mm/s] to perform fast filling of mold 2 (step S7).

The molding control function Fm detects (measures) the time from the injection start, the screw position, or the parting opening amount Lm, and monitors whether the set time Δts has elapsed, whether the set screw position Xs has been reached, or whether the switching determination value Lms has been reached. That is, whether or not the set switching point has been reached is monitored (step S8). In the example, the time is monitored. If 0.5 [seconds], which is the fast injection section Zf, have elapsed from the injection start point, fast injection is terminated (step S9). Thus, after the time Δts has elapsed from the injection start time, injection by the specific molding method, i.e., injection process by the specific molding condition Dc is performed (step S10).

In this case, the injection speed decreases from the fast injection speed Vf to the injection speed set by the specific molding condition Dc, specifically, to a set speed (about 80 mm/s in the example) considering the rated speed. Accordingly, the plastic-melted resin R in the heating cylinder 22 is filled into the cavity of mold 2 by the specific molding method, that is, the cavity is filled based on the specific molding condition Dc (step S11). As the resin R is filled, the injection pressure rises. When the injection pressure reaches the limit pressure Ps, control for maintaining the limit pressure Ps, i.e., control for preventing overshoot, is performed, maintaining the injection pressure at the limit pressure Ps (molding injection pressure Pi).

Further, when the cavity of mold 2 is filled with the resin R, mold 2 is pressurized by the resin R, and a parting opening amount Lm which becomes a natural gap based on the pressure is generated between the fixed mold 2c and the movable mold 2m (step S12). The parting opening amount Lm is within an allowable range of 0.03-0.30 [mm], preferably within an allowable range of 0.03-0.20 [mm], depending on the molding clamping force Pc and the molding injection pressure Pi set in advance, to realize degassing and good molding in which defects are eliminated. FIG. 8b shows the state of mold 2 at this time.

When the specific molding mode is selected, since the fast injection section Zf does not exist, the injection operation under the specific molding condition Dc is started when the injection start timing is reached (steps S4, S5, and S9).

On the other hand, when the injection time ends, injection filling ends (step S13). Further, solidification of the resin R in the cavity of mold 2 progresses by cooling, and compression (natural compression) of the resin R occurs in accordance with the solidification (step S14). After the lapse of the set cooling time, the switching of the valve circuit 37 and the servo motor 39 are controlled, and the mold clamping cylinder 27 is drive-controlled so that the movable mold 2m is retracted to open the mold. Further, the ejector cylinder 34 is driven and controlled to eject the molded product G (100) attached to the movable mold 2m, that is, to take out the molded product G (100) (step S15). This terminates the molding cycle.

The cooling time at this time can be set as the elapsed time from the injection start timing. When the cooling time has elapsed, the natural compression of the resin R slightly opens the parting opening amount Lm between the fixed mold 2c and the movable mold 2m as a residual gap (Lm). The residual gap should be within an allowable range of 0.01-0.10 mm, preferably 0.01-0.04 mm. This ensures natural compression of the resin R in the cavity of mold 2, high quality and uniformity in the molded product G.

Figure 11:
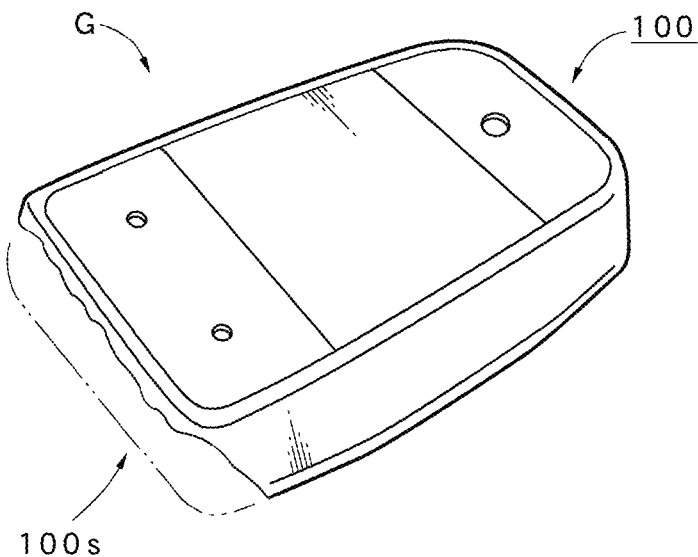
FIG. 11 is an external perspective view showing an example of a large molded product molded by the injection molding method according to the prior art.

FIG. 8c shows the state of mold 2 when the cooling time has elapsed. FIG. 10 shows an external view of a large molded product 100 (G) molded. In the case where the injection molding method according to the present embodiment is not used for the large molded product 100, as described above, even in the same large molded product 100, as shown in FIG. 11, short-circuit failure occurs in the end portion 100s. However, the injection molding method according to the present embodiment eliminates short-circuiting and ensures good molding.

On the other hand, from the injection start point, the mold position detector 18 detects the size of the parting opening amount Lm. The parting opening amount display function Fd graphically displays the detected size of the parting opening amount Lm on the waveform display unit Vsg of the display 3d. The change in the parting opening amount Lm by the injection molding method according to the present embodiment has a change characteristic indicated by a solid line Kf in FIG. 5. As a result, the operator can easily and effectively monitor visually the changing state of the parting opening amount Lm of mold 2, which is the behavior on the mold clamping device Mc side. The operator can also display the parting opening amount Lm for each shot in an overlapping manner so that the variation state, and the like can be easily grasped (step S16).

The change characteristic indicated by the dotted line Ks in FIG. 5 is a change characteristic when the fast injection section Zf is not provided, that is, in the case of molding under the specific molding condition Dc from the injection start. As is apparent from FIG. 5, the injection molding method according to the present embodiment substantially shortens the injection filling time, thereby achieving a high cycle of the molding cycle.

Further, the error processing function Fe monitors the parting opening amount Lm from the injection start, monitors whether the size of the parting opening amount Lm has reached the set error determination value Lmj and performs predetermined error processing if the size of the parting opening amount Lm has reached the error determination value Lmj (steps S17 and S18). For example, as the error processing, control for immediately stopping the operation of the injection molding machine M or control for outputting an alarm can be performed. Accordingly, setting the fast injection speed Vf enables the quick detection of excessive injection pressure, generating an abnormally high resin pressure in mold 2. Therefore, it is possible to quickly perform error processing such as operation stop, thereby preventing damage to mold 2.

The embodiment exemplifies the provision of the mode switching function Fs capable of switching between the fast molding mode and the specific molding mode by the mode switching key 71, i.e., the mode switching function Fs selectively switchable between the specific molding mode in which the fast injection section Zf is 0 section and the fast molding mode in which the fast injection section Zf is a section other than the 0 section. However, the injection molding method may not include the mode switching function Fs and may only use fast molding mode. In this case, setting the fast injection section Xf for fast injection to 0 allows for molding substantially in the specific molding mode. However, the mode switching function Fs provision enables the setting of the fast injection condition Df and the specific molding condition Dc in advance. It facilitates switching and use of the fast molding mode and the specific molding mode. In addition, the mode switching function Fs enables an optimal injection molding method with excellent versatility and developability for the user side. For example, one injection molding machine M allows for high-quality and high-homogeneity molding utilizing the advantages of the specific molding method based on the specific molding conditions Dc, and all-round molding for a wide range of sizes of molded products from small to large molded products.

On the other hand, the above-described embodiment uses a direct pressure type hydraulic mold clamping device Mcs displacing the movable mold $2m$ by the drive ram $11p$ of the mold clamping cylinder 11 as the mold clamping device Mc. However, a toggle-type mold clamping device Mct shown in FIG. 9 as a modification example can also be used as the mold clamping device Mc.

As shown in FIG. 9, the toggle-type mold clamping device Mct includes a movable board 15 supporting a movable mold $2m$, slidably mounted on a tie bar 14 installed between the fixed board 12 supporting the fixed mold $2c$ and a pressure-receiving board 13, and the toggle link mechanism 16 disposed between the pressure-receiving board 13 and the movable board 15. The toggle-type mold clamping device is a mold clamping force with the drive mechanism 17 driving the toggle link mechanism 16 to open and close the molds of the movable mold $2m$ and the fixed mold $2c$. Mold clamping in a non-lock-up state realizes the injection molding method according to this embodiment.

The exemplified mold clamping device Mct includes, as a more specific configuration, the fixed board 12 and the pressure-receiving board 13 arranged apart from each other. The fixed board 12 is fixed on a machine table (not shown). The pressure-receiving board 13 is supported on the machine table to be movable forward and backward. A plurality of (four) tie bars 14 are installed between the fixed board 12 and the pressure-receiving board 13. The front end of each tie bar 14 is fixed to the fixed board 12, and the rear end of each tie bar 14 is inserted into the pressure-receiving board 13. On the other hand, a movable board 15 is mounted so as to be slidable on the tie bar 13. The movable board 15 supports the movable mold $2m$, and the fixed board 12 supports the fixed mold $2c$. The toggle link mechanism 16 is provided between the pressure-receiving board 13 and the movable board 15. The toggle link mechanism 16 has a pair of first links pivotally supported by the pressure-receiving board 13, a pair of output links pivotally supported by the movable board 15, and a pair of second links coupled to the support shafts of the first link and the output link, and pivotally supports the crosshead mh to the second links. Further, reference numeral 17 denotes a drive mechanism unit disposed between the pressure-receiving board 13 and the crosshead 91. The drive mechanism portion 17 includes a ball screw mechanism 92 having a ball screw portion rotatably supported by the pressure-receiving board 13 and a ball-nut portion screwed to the ball-screw portion and integrally provided with the crosshead 91, and also includes a rotation drive unit 93 for rotationally driving the ball screw portion. As a result, when the drive motor $93m$ of the rotary drive unit 93 is actuated, the ball screw portion rotates, and the ball nut portion moves forward and backward. As a result, the crosshead mh integral with the ball-nut portion moves forward and backward, the toggle link mechanism 16 bends or extends, and the movable board 15 moves forward and backward in the mold opening direction (backward direction) or the mold closing direction (forward direction). Reference numeral 94 denotes a mold thickness adjusting device attached to the pressure-receiving board 13. The mold thickness adjusting device 94 is configured by forming a screw portion on the rear end side of the four tie bars 14 and screwing an adjusting nut to each screw portion. In the example, by driving the mold thickness adjusting motor 95 using a geared motor, each adjusting nut is rotated to adjust the longitudinal position of the pressure-receiving board 13.

The toggle-type mold clamping device Mct performs mold clamping in a non-lock-up state. In the lock-up state, the toggle link mechanism 16 becomes fully extended, as shown in FIG. 9, and the opening of mold 2 by the resin pressure basically depends on the extension of the tie bars 14. Therefore, setting the mold position of the movable mold $2m$ in the lock-up state to 0 mm and drive-control the drive motor $93m$ to slightly retract the position of the movable mold $2m$ in the mold opening direction by bending the toggle link mechanism 16 can set the lock-up state to a non-lock-up state, whereby the drive motor $93m$ can control the backpressure (mold clamping force) against the movable mold $2m$.

Therefore, even in the case of the toggle-type mold clamping device Mct, which cannot realize the natural compression in the original use mode, the mold clamping in the non-lock-up state can enable the natural compression, realizing the injection molding method according to the present invention. The various effects described above based on the injection molding method can be enjoyed. As described above, not only the hydraulic mold clamping device Mc (Mcs) but also the electric mold clamping device Mc (Mct) can implement the injection molding method according to the present embodiment in the same manner, so that it can be provided as an injection molding method having high versatility and developability (applicability).

Therefore, according to the injection molding method of the present embodiment, as a basic technique, at least a mold clamping device Mc, which enables natural compression of the resin R as the resin R solidifies inside the mold 2 is used. A molding injection pressure Pi which creates the parting opening amount Lm between the movable mold $2m$ and the fixed mold $2c$ of the mold 2 during injection filling, which becomes a predetermined gap, and a molding clamping force Pc which creates a mold clamping force capable of molding a good product are determined in advance to set a specific molding condition Dc. A fast injection speed Vf from the start of injection, which is higher than the injection speed set by the specific molding condition Dc, and a fast injection section Zf which continues the fast injection speed Vf are set as a fast injection condition Df. During molding, the molding clamping force Pc mold-clamps the mold and the molding injection pressure Pi is set to the limit pressure Ps. the resin R is injected into mold 2 under the fast injection condition Df from the start of injection. Injection filling of the resin R under the specific molding condition Dc is performed by the end of the fast injection section Zf. At the initial stage of filling, the resin R can be injection-filled to, for example, near the end of the mold 2 under the fast injection condition Df, and then injection-filled under the specific molding condition Dc.

Therefore, even in a large molded product with a long flow length of the resin R, a short defect occurring at the end portion can be avoided. As in the case of a small-sized or medium-sized molded product, high-quality and highly uniform molding can be performed by utilizing the advantages of the specific molding method based on the specific molding conditions Dc. The molding cycle can be made high cycle based on the substantial shortening of the injection filling time.

Further, since the molding can basically be performed based on the specific molding condition Dc, a predetermined mold gap Lm can be generated by the basic effect based on the specific molding condition Dc, i.e., the relative force relationship between the constant molding clamping force Pc and the constant molding injection pressure Pi, and the natural compression by the molding clamping force Pc can be generated even after the injection filling of the resin R is completed, thereby ensuring a high level of quality and uniformity for the molded product G (100). Therefore, it is suitable for molding the resin R having characteristics sensitive to temperature, pressure, and the like.

Further, setting various molding conditions, including measurement conditions such as injection conditions requiring accuracy and measurement values requiring accurate measurement, is unnecessary or significantly reduced. Therefore, it is possible to simplify the molding conditions, facilitate the setting thereof, facilitate the quality control, and facilitate operation control during the production.

Although the present invention has been described in detail with reference to the best embodiments, including modifications, the present invention is not limited to such embodiments, and may be arbitrarily modified, added, or deleted in terms of the detailed configuration, shape, material, quantity, method, etc., without departing from the gist of the present invention.

For example, although a large molded product is exemplified as a molded product, the size of the molded product is not specified (restricted). Therefore, for example, when the viscosity of the resin R is large, the injection molding method according to the present invention is effective even for a small-sized molded product. The size of the molded product is arbitrary within the scope of the present invention. Although the reflective range-finding sensor 18s has been exemplified as the mold position detector 18, various sensors such as proximity sensors that are non-contact and can accurately detect gaps can be used. Further, although a predetermined residual gap should be formed between the movable mold 2m and the fixed mold 2c after the elapse of the cooling time, the case where no residual gap is formed is not excluded. On the other hand, although an allowable range of 0.03-0.30 [mm] as the parting opening amount Lm and an allowable range of 0.01-0.10 [mm] as the residual gap have been exemplified, they are not limited to these ranges. They can be appropriately changed according to the type of resin R having different viscosity, or the like. The molding injection pressure Pi should be set to a minimum value or a value in the vicinity of the minimum value. A case is not excluded where the molding injection pressure Pi is other than the minimum value or a value near the minimum value.

INDUSTRIAL APPLICABILITY

The injection molding method and the injection molding machine according to the present invention can be used in various injection molding machines that inject and fill resin from an injection device into a mold mold-clamped by the mold clamping force to perform molding and can be used as an injection molding method thereof.

The invention claimed is:

1. An injection molding machine comprising:
   a mold clamping device for clamping a mold comprising a fixed mold and a movable mold by a predetermined mold clamping force;
   an injection device for injecting and filling a resin into the mold by a predetermined injection pressure, wherein the mold clamping device enables natural compression of the resin at least as the resin inside the mold solidifies; and
   a molding machine controller at least comprising:
   a specific molding condition setting function for setting a specific molding condition for a start of injection by obtaining a parting opening amount which becomes a predetermined gap between the movable mold and the fixed mold during injection filling, a molding injection pressure which becomes an injection pressure capable of molding a product and a molding clamping force which becomes a mold clamping force capable of molding a product;
   a fast injection condition setting function for setting, as a fast injection condition, a fast injection speed from the start of injection, the fast injection speed being higher than the injection speed set by the specific molding condition, and a fast injection section for continuing the fast injection speed; and
   a molding control function for mold-clamping the mold clamping device by the molding clamping force, setting the molding injection pressure to a limit pressure, injecting and filling the mold by the fast injection condition from the start of injection, and filling the mold by the specific molding condition by an end of the fast injection section.

2. The injection molding machine according to claim 1, wherein said mold clamping device is a direct pressure type hydraulic mold clamping device displacing said movable mold by a drive ram of a mold clamping cylinder.

3. The injection molding machine according to claim 1, wherein a movable board supporting the movable mold is slidably loaded into a tie bar installed between a fixed board supporting the fixed mold and a pressure-receiving board and said mold clamping device comprises a toggle link mechanism disposed between said pressure-receiving board and said movable board, and a toggle-type mold clamping device for opening and closing said movable and fixed molds by driving said toggle link mechanism by means of a drive mechanism unit, and performs mold clamping in a non-lock-up state.

4. The injection molding machine according to claim 1, wherein said mold clamping device comprises a mold position detector attached to said mold to detect said parting opening amount by a relative position between said movable mold and said fixed mold.

5. The injection molding machine according to claim 4, wherein the molding machine controller has a parting opening amount display function for graphically displaying the parting opening amount detected by the mold position detector on a display.

6. The injection molding machine according to claim 4, wherein the molding machine controller has an error processing function for performing a predetermined error processing function when a size of the parting opening amount detected during molding reaches an error determination value set for the parting opening amount.

7. The injection molding machine according to claim 1, wherein the molding machine controller has a mode switching function capable of selectively switching between a specific molding mode in which the fast injection section is a 0 section and a fast molding mode in which the fast injection section is a section other than the 0 section.

* * * * *